US011613074B2

(12) United States Patent
Gabriel et al.

(10) Patent No.: US 11,613,074 B2
(45) Date of Patent: Mar. 28, 2023

(54) SINTER POWDER CONTAINING A MINERAL FLAME RETARDANT FOR PRODUCING MOULDED BODIES

(71) Applicant: BASF SE, Ludwigshafen am Rhein (DE)

(72) Inventors: Claus Gabriel, Ludwigshafen am Rhein (DE); Natalie Beatrice Janine Herle, Ludwigshafen am Rhein (DE); Thomas Meier, Ludwigshafen am Rhein (DE); Michael Roth, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 455 days.

(21) Appl. No.: 16/652,839

(22) PCT Filed: Oct. 1, 2018

(86) PCT No.: PCT/EP2018/076685
§ 371 (c)(1),
(2) Date: Apr. 1, 2020

(87) PCT Pub. No.: WO2019/068659
PCT Pub. Date: Apr. 11, 2019

(65) Prior Publication Data
US 2020/0230876 A1    Jul. 23, 2020

(30) Foreign Application Priority Data
Oct. 4, 2017   (EP) ..................................... 17194725

(51) Int. Cl.
*B29C 64/153*     (2017.01)
*B29C 64/165*     (2017.01)
(Continued)

(52) U.S. Cl.
CPC .......... *B29C 64/153* (2017.08); *B29C 64/165* (2017.08); *B33Y 70/10* (2020.01);
(Continued)

(58) Field of Classification Search
CPC .. B29C 64/153; B29C 64/165; B29K 2077/00
See application file for complete search history.

(56) References Cited

U.S. PATENT DOCUMENTS 6,136,948 A    10/2000 Dickens, Jr. et al.
7,148,286 B2   12/2006 Baumann et al.
(Continued)

FOREIGN PATENT DOCUMENTS

AU   2005273838 A1   2/2006
CA      3014262 A1   8/2017
(Continued)

OTHER PUBLICATIONS

International Search Report for PCT/EP2018/076684 dated Feb. 11, 2019.
(Continued)

*Primary Examiner* — James Sanders
(74) *Attorney, Agent, or Firm* — Faegre Drinker Biddle & Reath LLP

(57) ABSTRACT

The present invention relates to a process for producing a shaped body, wherein, in step i), a layer of a sinter powder (SP) comprising at least one mineral flame retardant inter alia is provided and, in step ii), the layer provided in step i) is exposed. The present invention further relates to a process for producing a sinter powder (SP) and to a sinter powder (SP) obtainable by this process. The present invention also relates to the use of the sinter powder (SP) in a sintering process and to shaped bodies obtainable by the process of the invention.

8 Claims, 1 Drawing Sheet

(51) Int. Cl.
*B33Y 70/10* (2020.01)
*B33Y 10/00* (2015.01)
*B33Y 80/00* (2015.01)
*B29K 77/00* (2006.01)
*B29K 305/02* (2006.01)

(52) U.S. Cl.
CPC ...... *B29K 2077/00* (2013.01); *B29K 2305/02* (2013.01); *B33Y 10/00* (2014.12); *B33Y 80/00* (2014.12)

(56) References Cited

U.S. PATENT DOCUMENTS

| | | |
|---|---|---|
| 2006/0041041 A1 | 2/2006 | Douais et al. |
| 2007/0290410 A1 | 12/2007 | Koo et al. |
| 2014/0141166 A1 | 5/2014 | Rodgers |
| 2016/0369098 A1 | 12/2016 | Yasuda et al. |
| 2017/0190905 A1 | 7/2017 | Arai et al. |
| 2018/0355123 A1 | 12/2018 | Diekmann et al. |
| 2019/0071568 A1 | 3/2019 | Gabriel et al. |
| 2019/0160737 A1 | 5/2019 | Gabriel et al. |
| 2019/0168450 A1 | 6/2019 | Gabriel et al. |
| 2019/0177537 A1 | 6/2019 | Gabriel et al. |
| 2019/0202102 A1 | 7/2019 | Puch et al. |
| 2019/0264029 A1 | 8/2019 | Lohwasser et al. |
| 2020/0010627 A1 | 1/2020 | Gramlich et al. |
| 2020/0023577 A1 | 1/2020 | Ostermann et al. |
| 2020/0048434 A1 | 2/2020 | Roth et al. |
| 2020/0230875 A1 | 7/2020 | Meier et al. |

FOREIGN PATENT DOCUMENTS

| | | |
|---|---|---|
| CN | 105764675 A | 7/2016 |
| DE | 102015016131 A1 | 6/2017 |
| EP | 1411087 A1 | 4/2004 |
| JP | 2008-505243 A | 2/2008 |
| JP | 2017-019267 A | 1/2017 |
| WO | WO-9606881 A2 | 3/1996 |
| WO | 2010/075395 A2 | 7/2010 |
| WO | 2015/081009 A1 | 6/2015 |
| WO | WO-2016112283 A1 | 7/2016 |
| WO | 2017/140779 A1 | 8/2017 |
| WO | WO-2017140764 A1 | 8/2017 |
| WO | WO-2017158688 A1 | 9/2017 |
| WO | 2017/216022 A1 | 12/2017 |
| WO | 2018/158224 A1 | 9/2018 |
| WO | 2018/234429 A1 | 12/2018 |
| WO | WO-2019068658 A1 | 4/2019 |

OTHER PUBLICATIONS

International Search Report for PCT/EP2018/076685 dated Nov. 12, 2018.
Written Opinion of the International Searching Authority for PCT/EP2018/076684 dated Feb. 11, 2019.
Written Opinion of the International Searching Authority for PCT/EP2018/076685 dated Nov. 12, 2018.
Size Exclusion Chromatography-Multi-Angle Laser Light Scattering according to Chi-san Wu "Handbook of size exclusion chromatography and related techniques", p. 19.

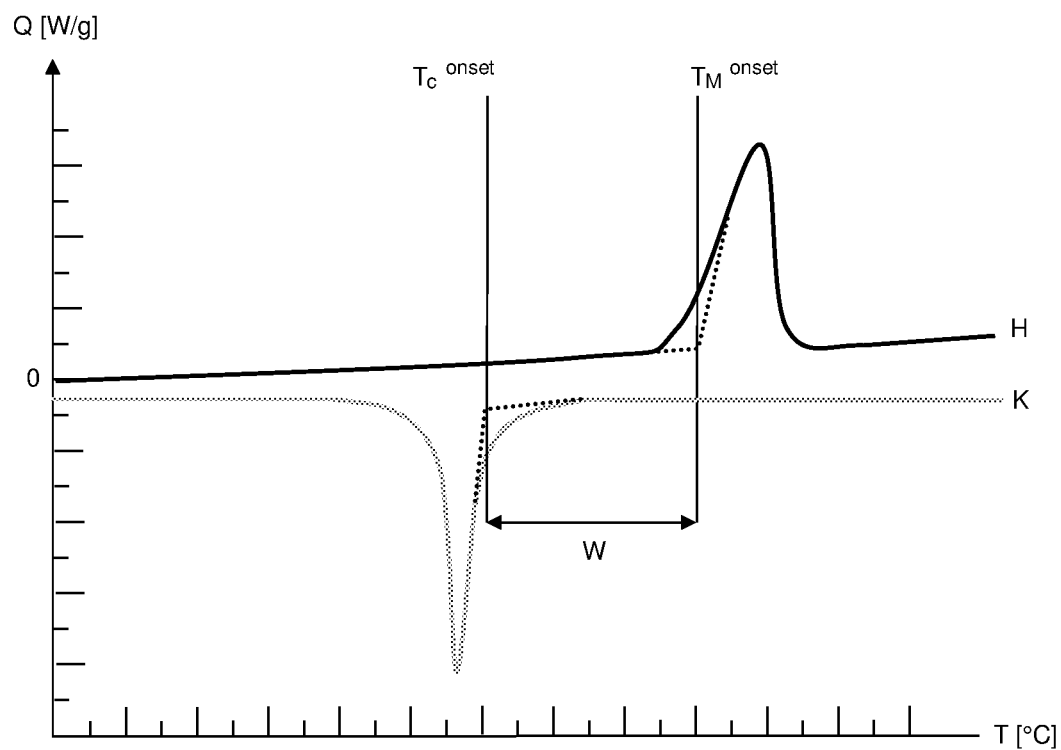

SINTER POWDER CONTAINING A MINERAL FLAME RETARDANT FOR PRODUCING MOULDED BODIES

CROSS-REFERENCE TO RELATED APPLICATIONS

This application is a national stage application (under 35 U.S.C. § 371) of PCT/EP2018/076685, filed Oct. 1, 2018, which claims benefit of European Application No. 17194725.2, filed Oct. 4, 2017, both of which are incorporated herein by reference in their entirety.

The present invention relates to a process for producing a shaped body, wherein, in step i), a layer of a sinter powder (SP) comprising at least one mineral flame retardant inter alia is provided and, in step ii), the layer provided in step i) is exposed. The present invention further relates to a process for producing a sinter powder (SP) and to a sinter powder (SP) obtainable by this process. The present invention also relates to the use of the sinter powder (SP) in a sintering process and to shaped bodies obtainable by the process of the invention.

The rapid provision of prototypes is a problem often addressed in very recent times. One process which is particularly suitable for this so-called "rapid prototyping" is selective laser sintering (SLS). This involves selectively irradiating a plastic powder in a chamber with a laser beam. The powder melts, the molten particles coalesce and resolidify. Repeated application of plastic powder and subsequent irradiation with a laser allows modeling of three-dimensional shaped bodies.

The process of selective laser sintering for producing shaped bodies from pulverulent polymers is described in detail in patent specifications U.S. Pat. No. 6,136,948 and WO 96/06881.

Selective laser sintering is frequently too time-consuming for the production of a relatively large number of shaped bodies, and so it is possible to produce relatively large volumes of shaped bodies using high-speed sintering (HSS) or "multijet fusion technology" (MJF) from HP. In high-speed sintering, by spray application of an infrared-absorbing ink onto the component cross section to be sintered, followed by exposure with an infrared source, a higher processing speed is achieved compared to selective laser sintering.

However, a disadvantage of high-speed sintering is that the powder should not sinter outside the shaped body cross section to be sintered, nor should it stick together. Therefore, it is necessary to use as low a construction space temperature as possible in the production. The effect of this is frequently that the melting of the shaped body is not good in the shaped body cross section to be sintered and/or resultant high component warpage.

There is also frequently component warpage in selective laser sintering. If further components (e.g. flame retardant) are present in the sinter powder as well as a pure polyamide or another pure semicrystalline polymer, the sintering window of the sinter powder is frequently reduced in the selective laser sintering operation. A reduction in the sintering window frequently leads to warpage of the shaped bodies during the production by selective laser sintering. This warpage virtually rules out use or further processing of the shaped bodies. Even during the production of the shaped bodies, the warpage can be so severe that further layer application is impossible and therefore the production process has to be stopped.

A problem both with high-speed sintering or multi-jet fusion technology and with selective laser sintering is additionally that the resultant shaped bodies frequently have low heat distortion resistance and frequently fail flame retardancy tests. The effect of the addition of flame retardants to improve fire resistance is frequently that the components present in the sinter powder react with the flame retardant, for example in the form of crosslinking reactions, and hence have a lasting adverse effect on the properties thereof. Moreover, it is problematic that flame retardants frequently lead to unwanted or even toxic emissions in the construction space when the sinter powders are used in the methods mentioned.

It was thus an object of the present invention to provide a process for producing shaped bodies which has the aforementioned disadvantages of the processes described in the prior art only to a reduced degree, if at all. The process should additionally be performable in a simple and inexpensive manner.

This object is achieved by a process for producing a shaped body, comprising the steps of
i) providing a layer of a sinter powder (SP) comprising the following components:
(A) at least one semicrystalline polyamide,
(B) at least one amorphous polyamide,
(C) at least one mineral flame retardant,
ii) exposing the layer of the sinter powder (SP) provided in step i).

It has been found that, surprisingly, shaped bodies that have been produced by the process of the invention have a particularly good UL 94 flame retardancy level without any adverse effect on the other properties of the shaped bodies. Surprisingly, there is even improvement in some properties of the shaped bodies. More particularly, the shaped bodies produced by the process of the invention still have particularly good mechanical properties, especially a high modulus and good tensile strength, and elevated toughness relative to shaped bodies that do not comprise any component (C). The shaped bodies produced in accordance with the invention additionally have particularly good heat distortion resistance.

The sinter powder of the invention additionally has good thermooxidative stability, which results in good reusability of the sinter powder (SP), i.e. good recyclability from the construction space.

More particularly, the process of the invention is also of good suitability as a selective laser sintering process and as a high-speed sintering process or multijet fusion process since the sinter powder (SP) used in accordance with the invention has a broad sintering window.

The process of the invention is elucidated in detail hereinafter.

Step i)

In step i), a layer of the sinter powder (SP) is provided.

The layer of the sinter powder (SP) can be provided by any methods known to those skilled in the art. Typically, the layer of the sinter powder (SP) is provided in a construction space on a construction platform. The temperature of the construction space may optionally be controlled.

The construction space has, for example, a temperature in the range from 1 to 100 K (kelvin) below the melting temperature ($T_M$) of the sinter powder (SP), preferably a temperature in the range from 5 to 50 K below the melting temperature ($T_M$) of the sinter powder (SP) and especially preferably a temperature in the range from 10 to 25 K below the melting temperature ($T_M$) of the sinter powder (SP).

The construction space has, for example, a temperature in the range from 150 to 250° C., preferably in the range from 160 to 230° C. and especially preferably in the range from 170 to 210° C.

The layer of the sinter powder (SP) can be provided by any methods known to those skilled in the art. For example, the layer of the sinter powder (SP) is provided by means of a coating bar or a roll in the thickness to be achieved in the construction space.

The thickness of the layer of the sinter powder (SP) which is provided in step i) may be as desired. For example, it is in the range from 50 to 300 μm, preferably in the range from 70 to 200 μm and especially preferably in the range from 90 to 150 μm.

Sinter Powder (SP)

According to the invention, the sinter powder (SP) comprises at least one semicrystalline polyamide as component (A), at least one amorphous polyamide as component (B), and at least one mineral flame retardant as component (C).

In the context of the present invention the terms "component (A)" and "at least one semicrystalline polyamide" are used synonymously and therefore have the same meaning.

The same applies to the terms "component (B)" and "at least one amorphous polyamide". These terms are likewise used synonymously in the context of the present invention and therefore have the same meaning.

Correspondingly, the terms "component (C)" and "at least one mineral flame retardant" are also used synonymously in the context of the present invention and have the same meaning.

The sinter powder (SP) may comprise components (A), (B) and (C) in any desired amounts.

For example, the sinter powder (SP) comprises in the range from 30% to 70% by weight of component (A), in the range from 5% to 25% by weight of component (B) and in the range from 20% to 60% by weight of component (C), based in each case on the sum total of the percentages by weight of components (A), (B) and (C), preferably based on the total weight of the sinter powder (SP).

Preferably, the sinter powder (SP) comprises in the range from 40% to 70% by weight of component (A), in the range from 7% to 23% by weight of component (B) and in the range from 22% to 45% by weight of component (C), based in each case on the sum total of the percentages by weight of components (A), (B) and (C), preferably based on the total weight of the sinter powder (SP).

Most preferably, the sinter powder (SP) comprises in the range from 50% to 65% by weight of component (A), in the range from 10% to 20% by weight of component (B) and in the range from 25% to 35% by weight of component (C), based in each case on the sum total of the percentages by weight of components (A), (B) and (C), preferably based on the total weight of the sinter powder (SP).

The present invention therefore also provides a process in which the sinter powder (SP) comprises in the range from 30% to 70% by weight of component (A), in the range from 5% to 25% by weight of component (B) and in the range from 20% to 60% by weight of component (C), based in each case on the total weight of the sinter powder (SP).

The sinter powder (SP) may further comprise at least one additive. For example, the at least one additive is selected from the group consisting of antinucleating agents, stabilizers, flow aids, end group functionalizers, dyes and color pigments.

An example of a suitable antinucleating agent is lithium chloride. Suitable stabilizers are, for example, phenols, phosphites and copper stabilizers.

Suitable end group functionalizers are, for example, terephthalic acid, adipic acid and propionic acid. Suitable dyes and color pigments are, for example, carbon black and iron chromium oxides.

Suitable flow aids are, for example, silicas or aluminas. A preferred flow aid is alumina. An example of a suitable alumina is Aeroxide® Alu C from Evonik.

For example, the sinter powder (SP) comprises in the range from 0.1% to 10% by weight of the at least one additive, preferably in the range from 0.2% to 5% by weight and especially preferably in the range from 0.3% to 2.5% by weight, based in each case on the total weight of the sinter powder (SP).

The present invention therefore also provides a process in which the sinter powder (SP) additionally comprises in the range from 0.1% to 10% by weight of at least one additive selected from the group consisting of antinucleating agents, stabilizers, end group functionalizers, dyes and color pigments, based on the total weight of the sinter powder (SP).

Preferably, the sinter powder (SP) also additionally comprises at least one reinforcing agent.

For example, the sinter powder (SP) comprises in the range from 5% to 60% by weight, preferably in the range from 10% to 50% by weight and especially preferably in the range from 15% to 40% by weight of at least one reinforcing agent, based in each case on the total weight of the sinter powder (SP).

The percentages by weight of components (A), (B) and (C) and optionally of the at least one additive and the at least one reinforcing agent typically add up to 100% by weight.

In the context of the present invention, "at least one reinforcing agent" means either exactly one reinforcing agent or a mixture of two or more reinforcing agents.

In the context of the present invention, a reinforcing agent is understood to mean a material that improves the mechanical properties of shaped bodies produced by the process of the invention compared to shaped bodies that do not comprise the reinforcing agent.

Reinforcing agents as such are known to those skilled in the art. For example, the at least one reinforcing agent may be in spherical form, in platelet form or in fibrous form.

Preferably, the at least one reinforcing agent is in platelet form or in fibrous form.

A "fibrous reinforcing agent" is understood to mean a reinforcing agent in which the ratio of length of the fibrous reinforcing agent to the diameter of the fibrous reinforcing agent is in the range from 2:1 to 40:1, preferably in the range from 3:1 to 30:1 and especially preferably in the range from 5:1 to 20:1, where the length of the fibrous reinforcing agent and the diameter of the fibrous reinforcing agent are determined by microscopy by means of image evaluation on samples after ashing, with evaluation of at least 70 000 parts of the fibrous reinforcing agent after ashing.

The length of the fibrous reinforcing agent in that case is typically in the range from 5 to 1000 am, preferably in the range from 10 to 600 μm and especially preferably in the range from 20 to 500 μm, determined by means of microscopy with image evaluation after ashing.

The diameter in that case is, for example, in the range from 1 to 30 μm, preferably in the range from 2 to 20 μm and especially preferably in the range from 5 to 15 μm, determined by means of microscopy with image evaluation after ashing.

In a further preferred embodiment, the at least one reinforcing agent is in platelet form. In the context of the present invention, "in platelet form" is understood to mean that the particles of the at least one reinforcing agent have a ratio of diameter to thickness in the range from 4:1 to 10:1, determined by means of microscopy with image evaluation after ashing.

Suitable reinforcing agents are known to those skilled in the art and are selected, for example, from the group consisting of carbon nanotubes, carbon fibers, boron fibers, glass fibers, glass beads, silica fibers, ceramic fibers, basalt fibers, aluminosilicates, aramid fibers and polyester fibers.

Preferred fibrous reinforcing agents are glass fibers and/or carbon fibers. These reinforcing agents may additionally have been aminosilane-functionalized.

Suitable silica fibers are, for example, wollastonite.

Suitable aluminosilicates are known as such to the person skilled in the art. Aluminosilicates refer to compounds comprising $Al_2O_3$ and $SiO_2$. In structural terms, a common factor among the aluminosilicates is that the silicon atoms are tetrahedrally coordinated by oxygen atoms and the aluminum atoms are octahedrally coordinated by oxygen atoms. Aluminosilicates may additionally comprise further elements.

Preferred aluminosilicates are sheet silicates. Particularly preferred aluminosilicates are calcined aluminosilicates, especially preferably calcined sheet silicates. The aluminosilicate may additionally have been aminosilane-functionalized.

If the at least one reinforcing agent is an aluminosilicate, the aluminosilicate may be used in any form. For example, it can be used in the form of the pure aluminosilicate, but it is likewise possible that the aluminosilicate is used in mineral form. Preferably, the aluminosilicate is used in mineral form. Suitable aluminosilicates are, for example, feldspars, zeolites, sodalite, sillimanite, andalusite and kaolin. Kaolin is a preferred aluminosilicate.

The present invention therefore also provides a process in which the sinter powder (SP) additionally comprises kaolin as at least one reinforcing agent.

Kaolin is one of the clay rocks and comprises essentially the mineral kaolinite. The empirical formula of kaolinite is $Al_2[(OH)_4/Si_2O_5]$. Kaolinite is a sheet silicate. As well as kaolinite, kaolin typically also comprises further compounds, for example titanium dioxide, sodium oxides and iron oxides. Kaolin preferred in accordance with the invention comprises at least 98% by weight of kaolinite, based on the total weight of the kaolin.

The sinter powder (SP) comprises particles. These particles have, for example, a size in the range from 10 to 250 μm, preferably in the range from 15 to 200 μm, more preferably in the range from 20 to 120 μm and especially preferably in the range from 20 to 110 μm.

The sinter powder (SP) of the invention has, for example,
a D10 in the range from 10 to 60 μm,
a D50 in the range from 25 to 90 μm and
a D90 in the range from 50 to 150 am.

Preferably, the sinter powder (SP) of the invention has
a D10 in the range from 20 to 50 μm,
a D50 in the range from 40 to 80 μm and
a D90 in the range from 80 to 125 am.

The present invention therefore also provides a process in which the sinter powder (SP) has
a D10 in the range from 10 to 60 μm,
a D50 in the range from 25 to 90 μm and
a D90 in the range from 50 to 150 μm.

In the context of the present invention, the "D10" is understood to mean the particle size at which 10% by volume of the particles based on the total volume of the particles are smaller than or equal to D10 and 90% by volume of the particles based on the total volume of the particles are larger than D10. By analogy, the "D50" is understood to mean the particle size at which 50% by volume of the particles based on the total volume of the particles are smaller than or equal to D50 and 50% by volume of the particles based on the total volume of the particles are larger than D50. Correspondingly, the "D90" is understood to mean the particle size at which 90% by volume of the particles based on the total volume of the particles are smaller than or equal to D90 and 10% by volume of the particles based on the total volume of the particles are larger than D90.

To determine the particle sizes, the sinter powder (SP) is suspended in a dry state using compressed air or in a solvent, for example water or ethanol, and this suspension is analyzed. The D10, D50 and D90 values are determined by laser diffraction using a Malvern Mastersizer 3000. Evaluation is by means of Fraunhofer diffraction.

The sinter powder (SP) typically has a melting temperature ($T_M$) in the range from 160 to 280° C. Preferably, the melting temperature ($T_M$) of the sinter powder (SP) is in the range from 170 to 265° C. and especially preferably in the range from 175 to 245° C.

The melting temperature ($T_M$) is determined in the context of the present invention by means of differential scanning calorimetry (DSC). Typically, a heating run (H) and a cooling run (K) are measured, each at a heating rate/cooling rate of 20 K/min. This affords a DSC diagram as shown by way of example in FIG. 1. The melting temperature ($T_M$) is then understood to mean the temperature at which the melting peak of the heating run (H) of the DSC diagram has a maximum.

The sinter powder (SP) typically also has a crystallization temperature ($T_C$) in the range from 120 to 250° C. Preferably, the crystallization temperature ($T_C$) of the sinter powder (SP) is in the range from 130 to 240° C. and especially preferably in the range from 140 to 235° C.

The present invention therefore also provides a process in which the sinter powder (SP) has a crystallization temperature ($T_C$) in the range from 120 to 250° C.

The crystallization temperature ($T_C$) is determined in the context of the present invention by means of differential scanning calorimetry (DSC). This typically involves measuring a heating run (H) and a cooling run (K), each at a heating rate and a cooling rate of 20 K/min. This affords a DSC diagram as shown by way of example in FIG. 1.

The crystallization temperature ($T_C$) is then the temperature at the minimum of the crystallization peak of the DSC curve.

The sinter powder (SP) typically also has a sintering window ($W_{SP}$). The sintering window ($W_{SP}$) is, as described below, the difference between the onset temperature of melting ($T_M^{onset}$) and the onset temperature of crystallization ($T_C^{onset}$). The onset temperature of melting ($T_M^{onset}$) and the onset temperature of crystallization ($T_C^{onset}$) are determined as described below.

The sintering window ($W_{SP}$) of the sinter powder (SP) is, for example, in the range from 10 to 40 K (kelvin), more preferably in the range from 15 to 35 K and especially preferably in the range from 18 to 30 K.

The sinter powder (SP) can be produced by any methods known to those skilled in the art. For example, components (A), (B) and (C) and optionally the at least one additive and the at least one reinforcing agent may be ground with one another.

The grinding can be conducted by any methods known to those skilled in the art; for example, components (A), (B)

and (C) and optionally the at least one additive and the at least one reinforcing agent are introduced into a mill and ground therein.

Suitable mills include all mills known to those skilled in the art, for example classifier mills, opposed jet mills, hammer mills, ball mills, vibratory mills or rotor mills.

The grinding in the mill can likewise be effected by any methods known to those skilled in the art. For example, the grinding can take place under inert gas and/or while cooling with liquid nitrogen. Cooling with liquid nitrogen is preferred. The temperature in the grinding is as desired; preference is given to conducting the grinding at temperatures of liquid nitrogen, for example at a temperature in the range from −210 to −195° C. The temperature of the components during the grinding in that case is, for example, in the range from −40 to −30° C.

Preferably, the components are first mixed with one another and then ground. The process for producing the sinter powder (SP) in that case preferably comprises the steps of
a) mixing the following components:
(A) at least one semicrystalline polyamide,
(B) at least one amorphous polyamide,
(C) at least one mineral flame retardant,
b) grinding the mixture obtained in step a) to obtain the sinter powder (SP).

The present invention therefore also provides a process for producing a sinter powder (SP), comprising the steps of
a) mixing the following components:
(A) at least one semicrystalline polyamide,
(B) at least one amorphous polyamide,
(C) at least one mineral flame retardant,
b) grinding the mixture obtained in step a) to obtain the sinter powder (SP).

In a preferred embodiment, the process for producing the sinter powder (SP) comprises the following steps:
ai) mixing the following components:
(A) at least one semicrystalline polyamide,
(B) at least one amorphous polyamide,
(C) at least one mineral flame retardant,
bi) grinding the mixture obtained in step ai) to obtain a polyamide powder,
bii) mixing the polyamide powder obtained in step bi) with a flow aid to obtain the sinter powder (SP).

Suitable flow aids are, for example, silicas or aluminas. A preferred flow aid is alumina. An example of a suitable alumina is Aeroxide® Alu C from Evonik.

If the sinter powder (SP) comprises a flow aid, it is preferably added in process step bii). In one embodiment, the sinter powder (SP) comprises 0.1% to 1% by weight, preferably 0.2% to 0.8% by weight and more preferably 0.3% to 0.6% by weight of flow aid, based in each case on the total weight of the sinter powder (SP) and the flow aid.

The present invention therefore also further provides a process in which step b) comprises the following steps:
bi) grinding the mixture obtained in step a) to obtain a polyamide powder,
bii) mixing the polyamide powder obtained in step bi) with a flow aid to obtain the sinter powder (SP).

Processes for compounding (for mixing) in step a) are known as such to those skilled in the art. For example, the mixing can be effected in an extruder, especially preferably in a twin-screw extruder.

The present invention therefore also provides a process for producing a sinter powder (SP), in which the components are mixed in step a) in a twin-screw extruder.

In respect of the grinding in step b), the details and preferences described above are correspondingly applicable with regard to the grinding.

The present invention therefore also further provides the sinter powder (SP) obtainable by the process of the invention.

In one embodiment of the present invention, component (C) in the sinter powder (SP) has been coated with component (A) and/or with component (B).

Component (C) has been coated with component (A) and/or component (B) especially when the sinter powder (SP) has been produced by first mixing (compounding) components (A), (B) and (C) with one another, preferably when the sinter powder (SP) is produced by the above-described process comprising steps a) and b).

The present invention therefore also provides a process in which component (C) in the sinter powder (SP) has been coated with component (A) and/or with component (B).

In a further embodiment of the present invention, the sinter powder (SP) is in the form of a mixture. In other words, in this embodiment, components (A), (B) and (C) are present alongside one another and component (C) has not been coated with component (A) and/or component (B).

It will be appreciated that it is also possible for one portion of component (C) to have been coated with component (A) and/or component (B) and another portion of component (C) not to have been coated with component (A) and/or component (B).

Component (A)

According to the invention, component (A) is at least one semicrystalline polyamide.

In the context of the present invention "at least one semicrystalline polyamide" means either exactly one semicrystalline polyamide or a mixture of two or more semicrystalline polyamides.

"Semicrystalline" in the context of the present invention means that the polyamide has an enthalpy of fusion $\Delta H2_{(A)}$ of greater than 45 J/g, preferably of greater than 50 J/g and especially preferably of greater than 55 J/g, in each case measured by means of differential scanning calorimetry (DSC) according to ISO 11357-4:2014.

The at least one semicrystalline polyamide (A) of the invention thus typically has an enthalpy of fusion $\Delta H2_{(A)}$ of greater than 45 J/g, preferably of greater than 50 J/g and especially preferably of greater than 55 J/g, in each case measured by means of differential scanning calorimetry (DSC) according to ISO 11357-4:2014.

The at least one semicrystalline polyamide (A) of the invention typically has an enthalpy of fusion $\Delta H2_{(A)}$ of less than 200 J/g, preferably of less than 150 J/g and especially preferably of less than 100 J/g, in each case measured by means of differential scanning calorimetry (DSC) according to ISO 11357-4:2014.

Suitable semicrystalline polyamides (A) generally have a viscosity number ($VN_{(A)}$) in the range from 90 to 350 mL/g, preferably in the range from 100 to 275 mL/g and especially preferably in the range from 110 to 250 mL/g, determined in a 0.5% by weight solution of 96% by weight sulfuric acid at 25° C., measured to ISO 307:2013-8.

The present invention thus also provides a process in which component (A) has a viscosity number ($VN_{(A)}$) in the range from 90 to 350 mL/g, determined in a 0.5% by weight solution of component (A) in 96% by weight sulfuric acid at 25° C.

Component (A) of the invention typically has a melting temperature ($T_{M(A)}$). Preferably, the melting temperature ($T_{M(A)}$) of component (A) is in the range from 170 to 280°

C., more preferably in the range from 180 to 265° C. and especially preferably in the range from 185 to 245° C., determined to ISO 11357-3:2014.

The present invention thus also provides a process in which component (A) has a melting temperature ($T_{M(A)}$), where the melting temperature ($T_{M(A)}$) is in the range from 170 to 230° C.

Suitable components (A) have a weight-average molecular weight ($M_{W(A)}$) in the range from 500 to 2 000 000 g/mol, preferably in the range from 10 000 to 90 000 g/mol and especially preferably in the range from 20 000 to 70 000 g/mol. The weight-average molecular weight ($M_{W(A)}$) is determined by means of SEC-MALLS (Size Exclusion Chromatography-Multi-Angle Laser Light Scattering) according to Chi-san Wu "*Handbook of size exclusion chromatography and related techniques*", page 19.

Suitable as the at least one semicrystalline polyamide (A) are, for example, semicrystalline polyamides (A) that derive from lactams having 4 to 12 ring members.

Also suitable are semicrystalline polyamides (A) that are obtained by reaction of dicarboxylic acids with diamines. Examples of at least one semicrystalline polyamide (A) that derives from lactam include polyamides that derive from polycaprolactam, polycaprylolactam and/or polylaurolactam.

If at least a semicrystalline polyamide (A) obtainable from dicarboxylic acids and diamines is used, dicarboxylic acids used may be alkanedicarboxylic acids having 6 to 12 carbon atoms. Aromatic dicarboxylic acids are also suitable.

Examples of dicarboxylic acids here include adipic acid, azelaic acid, sebacic acid and dodecanedicarboxylic acid.

Examples of suitable diamines include alkanediamines having 4 to 12 carbon atoms and aromatic or cyclic diamines, for example m-xylylenediamine, di(4-aminophenyl)methane, di(4-aminocyclohexyl)methane, 2,2-di(4-aminophenyl)propane or 2,2-di(4-aminocyclohexyl)propane.

Preferred components (A) are polycaprolactam (nylon-6) and nylon-6/6,6 copolyamide. Nylon-6/6,6 copolyamide preferably has a proportion of 5% to 95% by weight of caprolactam units, based on the total weight of the nylon-6/6,6 copolyamide.

Also suitable as at least one semicrystalline polyamide (P) are polyamides obtainable by copolymerization of two or more of the monomers mentioned above and below or mixtures of a plurality of polyamides in any desired mixing ratio. Particular preference is given to mixtures of nylon-6 with other polyamides, especially nylon-6/6,6 copolyamide.

The non-comprehensive list which follows comprises the aforementioned polyamides and further suitable semicrystalline polyamides (A), and the monomers present.

AB Polymers:

| PA 4 | pyrrolidone |
|---|---|
| PA 6 | ε-caprolactam |
| PA 7 | enantholactam |
| PA 8 | caprylolactam |
| PA 9 | 9-aminopelargonic acid |
| P 11 | 11-aminoundecanoic acid |
| P 12 | laurolactam |

AA/BB Polymers:

| PA 46 | tetramethylenediamine, adipic acid |
|---|---|
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | dodecane-1,12-diamine, decanedicarboxylic acid |
| PA 1313 | tridecane-1,13-diamine, undecanedicarboxylic acid |
| PA 6T | hexamethylenediamine, terephthalic acid |
| PA MXD6 | m-xylylenediamine, adipic acid |
| PA 6/66 | (see PA 6 and PA 66) |
| PA 6/12 | (see PA 6 and PA 12) |
| PA 6/6,36 | ε-caprolactam, hexamethylenediamine, $C_{36}$ dimer acid |
| PA 6T/6 | (see PA 6T and PA 6) |

Preferably, component (A) is selected from the group consisting of PA 4, PA 6, PA 7, PA 8, PA 9, PA 11, PA 12, PA 46, PA 66, PA 69, PA 6.10, PA 6.12, PA 6.13, PA 6/6.36, PA 6T/6, PA 12.12, PA 13.13, PA 6T, PA MXD6, PA 6/66, PA 6/12 and copolyamides of these.

The present invention therefore also provides a process in which component (A) is selected from the group consisting of PA 4, PA 6, PA 7, PA 8, PA 9, PA 11, PA 12, PA 46, PA 66, PA 69, PA 6.10, PA 6.12, PA 6.13, PA 6/6.36, PA6T/6, PA 12.12, PA 13.13, PA 6T, PA MXD6, PA 6/66, PA 6/12 and copolyamides of these.

Most preferably, component (A) is selected from the group consisting of nylon-6 and nylon-6/6,6.

Component (B)

Component (B) is at least one amorphous polyamide.

In the context of the present invention "at least one amorphous polyamide" means either exactly one amorphous polyamide or a mixture of two or more amorphous polyamides.

"Amorphous" in the context of the present invention means that the polyamide does not have any melting point in differential scanning calorimetry (DSC) measured according to ISO 11357.

"No melting point" means that the enthalpy of fusion of the amorphous polyamide $\Delta H2_{(B)}$ is less than 10 J/g, preferably less than 8 J/g and especially preferably less than 5 J/g, in each case measured by means of differential scanning calorimetry (DSC) according to ISO 11357-4: 2014.

The at least one amorphous polyamide (B) of the invention thus typically has an enthalpy of fusion $\Delta H2_{(B)}$ of less than 10 J/g, preferably of less than 8 J/g and especially preferably of less than 5 J/g, in each case measured by means of differential scanning calorimetry (DSC) according to ISO 11357-4:2014.

Suitable amorphous polyamides generally have a viscosity number ($VN_{(B)}$) in the range from 60 to 200 mL/g, preferably in the range from 70 to 150 mL/g and especially preferably in the range from 75 to 125 mL/g, determined in a 0.5% by weight solution of component (B) in 96% by weight sulfuric acid at 25° C. to ISO 307:2013-08.

Component (B) of the invention typically has a glass transition temperature ($T_{G(B)}$), where the glass transition temperature ($T_{G(B)}$) is typically in the range from 100 to 180° C., preferably in the range from 110 to 160° C. and especially preferably in the range from 120 to 155° C., determined by means of ISO 11357-2:2014.

Suitable components (B) have a weight-average molecular weight ($M_{W(B)}$) in the range from 5000 to 35 000 g/mol, preferably in the range from 10 000 to 30 000 g/mol and especially preferably in the range from 15 000 to 25 000 g/mol. The weight-average molecular weight is determined by means of SEC-MALLS (Size Exclusion Chromatography Multi-Angle Laser Light Scattering) according to Chi-San Wu, "*Handbook of Size Exclusion Chromatography and the Related Techniques*", page 19.

Preferably, component (B) is an amorphous semiaromatic polyamide. Amorphous semiaromatic polyamides of this kind are known to those skilled in the art and are selected, for example, from the group consisting of PA 6I/6T, PA 6I and PA 6/3T. Component (B) is therefore preferably selected from the group consisting of PA6I/6T, PA 6I, PA 6/3T.

The present invention therefore also provides a process in which component (B) is selected from the group consisting of PA 6I/6T, PA 6I and PA 6/3T.

When polyamide 6I/6T is used as component (B), this may comprise any desired proportions of 6I and 6T structural units. Preferably, the molar ratio of 6I structural units to 6T structural units is in the range from 1:1 to 3:1, more preferably in the range from 1.5:1 to 2.5:1 and especially preferably in the range from 1.8:1 to 2.3:1.

The MVR (275° C./5 kg) (melt volume flow rate) of component (B) is preferably in the range from 50 mL/10 min to 150 mL/10 min, more preferably in the range from 95 mL/10 min to 105 mL/10 min.

The zero shear rate viscosity $\eta_0$ of component (B) is, for example, in the range from 770 to 3250 Pas. Zero shear rate viscosity $\eta_0$ is determined with a "DHR-1" rotary viscometer from TA Instruments and a plate-plate geometry with a diameter of 25 mm and a plate separation of 1 mm. Unequilibrated samples of component (B) are dried at 80° C. under reduced pressure for 7 days and these are then analyzed with a time-dependent frequency sweep (sequence test) with an angular frequency range of 500 to 0.5 rad/s. The following further analysis parameters were used: deformation: 1.0%, analysis temperature: 240° C., analysis time: 20 min, preheating time after sample preparation: 1.5 min.

Component (B) has an amino end group concentration (AEG) which is preferably in the range from 30 to 45 mmol/kg and especially preferably in the range from 35 to 42 mmol/kg.

For determination of the amino end group concentration (AEG), 1 g of component (B) is dissolved in 30 mL of a phenol/methanol mixture (volume ratio of phenol:methanol 75:25) and then subjected to potentiometric titration with 0.2N hydrochloric acid in water.

Component (B) has a carboxyl end group concentration (CEG) which is preferably in the range from 60 to 155 mmol/kg and especially preferably in the range from 80 to 135 mmol/kg.

For determination of the carboxyl end group concentration (CEG), 1 g of component (B) is dissolved in 30 mL of benzyl alcohol. This is followed by visual titration at 120° C. with 0.05N potassium hydroxide solution in water.

Component (C)

According to the invention, component (C) is at least one mineral flame retardant.

In the context of the present invention, "at least one mineral flame retardant" means either exactly one mineral flame retardant or a mixture of two or more mineral flame retardants.

In the context of the present invention, a mineral flame retardant is understood to mean a compound that restricts, slows or prevents the spread of fires and is additionally based on minerals.

It will be apparent that component (C) is different than any at least one reinforcing agent present in the sinter powder (SP). Component (C) is likewise different than any at least one additive present in the sinter powder (SP).

It is additionally preferable that the sinter powder (SP) does not comprise any mineral flame retardant except for component (C). Especially preferably, the sinter powder (SP) does not comprise any flame retardant except for component (C).

Preferably, the at least one mineral flame retardant is based on aluminum and/or magnesium.

The present invention therefore also provides a process in which component (C) is based on magnesium and/or aluminum.

Preference is given to flame retardants that eliminate water at elevated temperatures. Therefore, preferred mineral flame retardants are aluminum hydroxide and/or magnesium hydroxide and/or aluminum oxide hydroxide. Magnesium hydroxide is particularly preferred as the at least one mineral flame retardant.

The at least one mineral flame retardant may also be used, for example, as mineral. A suitable mineral is, for example, boehmite. Boehmite has the chemical composition AlO(OH) or γ-AlOOH (aluminum oxide hydroxide).

Aluminum hydroxide is also referred to as ATH or aluminum trihydroxide. Magnesium hydroxide is also referred to as MDH or magnesium dihydroxide.

The present invention therefore also provides a process in which component (C) is selected from the group consisting of magnesium hydroxide, aluminum oxide hydroxide and aluminum hydroxide.

Component (C) has, for example, a D10 in the range from 0.3 to 1.2 μm, a D50 in the range from 1.2 to 2 μm and a D90 in the range from 2 to 5 μm.

Preferably, component (C) has a D10 in the range from 0.5 to 1 μm, a D50 in the range from 1.3 to 1.8 μm and a D90 in the range from 2 to 4 am.

The D10, D50 and D90 values are determined as described above for the D10, D50 and D90 of the sinter powder (SP).

The present invention therefore also provides a process for producing a sinter powder (SP) in which component (C) has a D10 in the range from 0.3 to 1.2 μm, a D50 in the range from 1.2 to 2 μm and a D90 in the range from 2 to 5 μm.

Component (C) may additionally have been surface-modified. For example, component (C) has been aminosilane-modified.

Step ii)

In step ii), the layer of the sinter powder (SP) provided in step i) is exposed.

On exposure, at least some of the layer of the sinter powder (SP) melts. The molten sinter powder (SP) coalesces and forms a homogeneous melt. After the exposure, the molten part of the layer of the sinter powder (SP) cools down again and the homogeneous melt solidifies again.

Suitable methods of exposure include all methods known to one skilled in the art. Preferably, the exposure in step ii) is effected with a radiation source. The radiation source is preferably selected from the group consisting of infrared sources and lasers. Especially preferred infrared sources are near infrared sources.

The present invention therefore also provides a process in which the exposing in step ii) is effected with a radiation source selected from the group consisting of lasers and infrared sources.

Suitable lasers are known to those skilled in the art and for example fiber lasers, Nd:YAG lasers (neodymium-doped yttrium aluminum garnet laser) or carbon dioxide lasers.

If the radiation source used in the exposing in step ii) is a laser, the layer of the sinter powder (SP) provided in step i) is typically exposed locally and briefly to the laser beam. This selectively melts just the parts of the sinter powder (SP) that have been exposed to the laser beam. If a laser is used in step ii), the process of the invention is also referred to as selective laser sintering. Selective laser sintering is known per se to those skilled in the art.

If the radiation source used in the exposing in step ii) is an infrared source, especially a near infrared source, the wavelength at which the radiation source radiates is typically in the range from 780 nm to 1000 µm, preferably in the range from 780 nm to 50 am and especially in the range from 780 nm to 2.5 am.

In the exposing in step ii), in that case, the entire layer of the sinter powder (SP) is typically exposed. In order that only the desired regions of the sinter powder (SP) melt in the exposing, an infrared-absorbing ink (IR-absorbing ink) is typically applied to the regions that are to melt.

The process for producing the shaped body in that case preferably comprises, between step i) and step ii), a step i-1) of applying at least one IR-absorbing ink to at least part of the layer of the sinter powder (SP) provided in step i).

The present invention therefore also further provides a process for producing a shaped body, comprising the steps of
i) providing a layer of a sinter powder (SP) comprising the following components:
 (A) at least one semicrystalline polyamide,
 (B) at least one amorphous polyamide,
 (C) at least one mineral flame retardant,
i-1) applying at least one IR-absorbing ink to at least part of the layer of the sinter powder (SP) provided in step i),
ii) exposing the layer of the sinter powder (SP) provided in step i).

Suitable IR-absorbing inks are all IR-absorbing inks known to the person skilled in the art, especially IR-absorbing inks known to the person skilled in the art for high-speed sintering.

IR-absorbing inks typically comprise at least one absorber that absorbs IR radiation, preferably NIR radiation (near infrared radiation). In the exposing of the layer of the sinter powder (SP) in step ii), the absorption of the IR radiation, preferably the NIR radiation, by the IR absorber present in the IR-absorbing inks results in selective heating of the part of the layer of the sinter powder (SP) to which the IR-absorbing ink has been applied.

The IR-absorbing ink may, as well as the at least one absorber, comprise a carrier liquid. Suitable carrier liquids are known to those skilled in the art and are, for example, oils or solvents.

The at least one absorber may be dissolved or dispersed in the carrier liquid.

If the exposure in step ii) is effected with a radiation source selected from infrared sources and if step i-1) is conducted, the process of the invention is also referred to as high-speed sintering (HSS) or multijet fusion process (MJF). These methods are known per se to the person skilled in the art.

After step ii), the layer of the sinter powder (SP) is typically lowered by the layer thickness of the layer of the sinter powder (SP) provided in step i) and a further layer of the sinter powder (SP) is applied. This is subsequently exposed again in step ii).

This firstly bonds the upper layer of the sinter powder (SP) to the lower layer of the sinter powder (SP); in addition, the particles of the sinter powder (SP) within the upper layer are bonded to one another by fusion.

In the process of the invention, steps i) and ii) and optionally i-1) can thus be repeated.

By repeating the lowering of the powder bed, the applying of the sinter powder (SP) and the exposure and hence the melting of the sinter powder (SP), three-dimensional shaped bodies are produced. It is possible to produce shaped bodies that also have cavities, for example. No additional support material is necessary since the unmolten sinter powder (SP) itself acts as a support material.

The present invention therefore also further provides a shaped body obtainable by the process of the invention.

Of particular significance in the process of the invention is the melting range of the sinter powder (SP), called the sintering window ($W_{SP}$) of the sinter powder (SP).

The sintering window ($W_{SP}$) of the sinter powder (SP) can be determined by differential scanning calorimetry (DSC) for example.

In differential scanning calorimetry, the temperature of a sample, i.e. in the present case a sample of the sinter powder (SP), and the temperature of a reference are altered linearly over time. For this purpose, heat is supplied to/removed from the sample and the reference. The amount of heat Q necessary to keep the sample at the same temperature as the reference is determined. The amount of heat $Q_R$ supplied to/removed from the reference serves as a reference value.

If the sample undergoes an endothermic phase transformation, an additional amount of heat Q must be supplied to maintain the sample at the same temperature as the reference. If an exothermic phase transformation takes place, an amount of heat Q has to be removed to keep the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are heated in a linear manner. During the melting of the sample (solid/liquid phase transformation), an additional amount of heat Q has to be supplied to keep the sample at the same temperature as the reference. In the DSC diagram a peak known as the melting peak is then observed.

After the heating run (H), a cooling run (C) is typically measured. This involves cooling the sample and the reference linearly, i.e. heat is removed from the sample and the reference. During the crystallization/solidification of the sample (liquid/solid phase transformation), a greater amount of heat Q has to be removed to keep the sample at the same temperature as the reference, since heat is liberated in the course of crystallization/solidification. In the DSC diagram of the cooling run (C), a peak, called the crystallization peak, is then observed in the opposite direction from the melting peak.

In the context of the present invention, the heating during the heating run is typically effected at a heating rate of 20 K/min. The cooling during the cooling run in the context of the present invention is typically effected at a cooling rate of 20 K/min.

A DSC diagram comprising a heating run (H) and a cooling run (C) is depicted by way of example in FIG. 1. The DSC diagram can be used to determine the onset temperature of melting ($T_M^{onset}$) and the onset temperature of crystallization ($T_C^{onset}$).

To determine the onset temperature of melting ($T_M^{onset}$), a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis denotes the onset temperature of melting ($T_M^{onset}$).

To determine the onset temperature of crystallization ($T_C^{onset}$), a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis indicates the onset temperature of crystallization ($T_C^{onset}$).

The sintering window (W) results from the difference between the onset temperature of melting ($T_M^{onset}$) and the onset temperature of crystallization ($T_C^{onset}$). Thus:

$$W = T_M^{onset} - T_C^{onset}.$$

In the context of the present invention, the terms "sintering window ($W_{SP}$)", "size of the sintering window ($W_{SP}$)" and "difference between the onset temperature of melting ($T_M^{onset}$) and the onset temperature of crystallization ($T_C^{onset}$)" have the same meaning and are used synonymously.

The sinter powder (SP) of the invention is of particularly good suitability for use in a sintering process.

The present invention therefore also provides for the use of a sinter powder (SP) comprising the following components:
(A) at least one semicrystalline polyamide,
(B) at least one amorphous polyamide,
(C) at least one mineral flame retardant,
in a sintering process.

Shaped Body

The process of the invention affords a shaped body. The shaped body can be removed from the powder bed directly after the solidification of the sinter powder (SP) molten on exposure in step ii). It is likewise possible first to cool the shaped body and only then to remove it from the powder bed. Any adhering particles of the sinter powder that have not been melted can be mechanically removed from the surface by known methods.

Methods for surface treatment of the shaped body include, for example, vibratory grinding or barrel polishing, and also sandblasting, glass bead blasting or microbead blasting.

It is also possible to subject the shaped bodies obtained to further processing or, for example, to treat the surface.

The present invention therefore further provides a shaped body obtainable by the process of the invention.

The shaped bodies obtained typically comprise in the range from 30% to 70% by weight of component (A), in the range from 5% to 25% by weight of component (B) and in the range from 20% to 60% by weight of component (C), based in each case on the total weight of the shaped body.

Preferably, the shaped body comprises in the range from 40% to 70% by weight of component (A), in the range from 7% to 23% by weight of component (B) and in the range from 22% to 45% by weight of component (C), based in each case on the total weight of the shaped body.

Most preferably, the shaped body comprises in the range from 50% to 65% by weight of component (A), in the range from 10% to 20% by weight of component (B) and in the range from 25% to 35% by weight of component (C), based in each case on the total weight of the shaped body.

According to the invention, component (A) is the component (A) that was present in the sinter powder (SP). Component (B) is likewise the component (B) that was present in the sinter powder (SP), and component (C) is likewise the component (C) that was present in the sinter powder (SP).

If the sinter powder (SP) comprises the at least one additive and/or the at least one reinforcing agent, the shaped body obtained in accordance with the invention typically also comprises the at least one additive and/or the at least one reinforcing agent.

If step i-1) has been conducted, the shaped body additionally typically comprises the IR-absorbing ink.

It will be clear to the person skilled in the art that, as a result of the exposure of the sinter powder (SP), components (A), (B) and (C) and any at least one additive and the at least one reinforcing agent can enter into chemical reactions and be altered as a result. Such reactions are known to those skilled in the art.

Preferably, components (A), (B) and (C) and any at least one additive and the at least one reinforcing agent do not enter into any chemical reaction on exposure in step ii); instead, the sinter powder (SP) merely melts.

The invention is elucidated in detail hereinafter by examples, without restricting it thereto.

EXAMPLES

The following components are used:

semicrystalline polyamide (component (A)):

(P1) nylon-6 (Ultramid B27, BASF SE)

(P2) nylon-6/6,6 (Ultramid C33, BASF SE)

amorphous polyamide (component (B)):

(AP1) nylon-6I/6T (Grivory G16, EMS), with a molar ratio of 6I:6T of 1.9:1

(AP2) nylon-6/3T (Trogamid T 5000, Evonik)

mineral flame retardant (component (C)):

(FM1) magnesium hydroxide (Magnifin H5 IV, Albemarle), aminosilane-modified, bulk density 501 kg/m$^3$, particle size distribution D10=0.8 µm, D50=1.7 µm, D90=3.1 µm, determined by means of laser scattering Additive:

(A1) phenolic antioxidant (Irganox 1098 (N,N'-hexane-1,6-diylbis(3-(3,5-di-tert-butyl-4-hydroxyphenylpropionamide))), BASF SE)

(A2) carbon black in the form of batch UB420 (30% in PA 6), (Special black 4, CAS No. 1333-86-4, Evonik)

Table 1 states the essential parameters of the semicrystalline polyamides used (component (A)).

Table 2 the essential parameters of the amorphous polyamides used (component (B)).

TABLE 1

| | Type | AEG [mmol/kg] | CEG [mmol/kg] | $T_M$ [° C.] | $T_G$ [° C.] | Zero-shear viscosity $\eta_0$ at 240° C. [Pas] |
|---|---|---|---|---|---|---|
| P1 | PA 6 | 36 | 54 | 220.0 | 53 | 399 |
| P2 | PA 6/66 | 47 | 40 | 193.7 | 50 | 2300 |

TABLE 2

|  | Type | AEG [mmol/kg] | CEG [mmol/kg] | $T_g$, [° C.] | Zero-shear viscosity $\eta_0$ at 240° C. [Pas] |
|---|---|---|---|---|---|
| AP1 | PA 6I6T | 37 | 86 | 125 | 770 |
| AP2 | PA 6/3T | 45 | 59 | 150 | 7200 at 0.5 rad/s |

AEG indicates the amino end group concentration. This is determined by means of titration. For determination of the amino end group concentration (AEG), 1 g of the component (semicrystalline polyamide or amorphous polyamide) is dissolved in 30 mL of a phenol/methanol mixture (volume ratio of phenol:methanol 75:25) and then subjected to visual titration with 0.2N hydrochloric acid in water.

CEG indicates the carboxyl end group concentration. This is determined by means of titration. For determination of the carboxyl end group concentration (CEG), 1 g of the component (semicrystalline polyamide or amorphous polyamide) is dissolved in 30 mL of benzyl alcohol and then subjected to visual titration at 120° C. with 0.05 N potassium hydroxide solution in water.

The melting temperature ($T_M$) of the semicrystalline polyamides and all glass transition temperatures ($T_G$) were each determined by means of differential scanning calorimetry.

For determination of the melting temperature ($T_M$), as described above, a first heating run (H1) at a heating rate of 20 K/min was measured. The melting temperature ($T_M$) then corresponded to the temperature at the maximum of the melting peak of the first heating run (H1).

For determination of the glass transition temperature ($T_G$), after the first heating run (H1), a cooling run (C) and subsequently a second heating run (H2) were measured. The cooling run was measured at a cooling rate of 20 K/min. The first heating run (H1) and the second heating run (H2) were measured at a heating rate of 20 K/min. The glass transition temperature ($T_G$) was then determined at half the step height of the second heating run (H2).

The zero shear rate viscosity ηo was determined with a "DHR-1" rotary viscometer from TA Instruments and a plate-plate geometry with a diameter of 25 mm and a plate separation of 1 mm. Unequilibrated samples were dried at 80° C. under reduced pressure for 7 days and these were then analyzed with a time-dependent frequency sweep (sequence test) with an angular frequency range of 500 to 0.5 rad/s. The following further analysis parameters were used: deformation: 1.0%, analysis temperature: 240° C., analysis time: 20 min, preheating time after sample preparation: 1.5 min.

Production of Sinter Powders in a Twin-Screw Extruder

For production of sinter powders, the components specified in table 3 were compounded in the ratio specified in table 3 in a twin-screw extruder (ZE25) at a speed of 230 rpm (revolutions per minute) at 270° C. at a throughput of 20 kg/h, pelletized, and then processed with a liquid nitrogen-cooled pinned-disk mill to give powders (particle size distribution 10 to 100 μm).

TABLE 3

| Example | (P1) [% by wt.] | (P2) [% by wt.] | (AP1) [% by wt.] | (AP2) [% by wt.] | (FM1) [% by wt.] | (A1) [% by wt.] | (A2) [% by wt.] |
|---|---|---|---|---|---|---|---|
| V1 | 78.6 | | 21 | | | 0.4 | |
| B2 | 66.8 | | 17.8 | | 15 | 0.4 | |
| B3 | 62.8 | | 16.8 | | 20 | 0.4 | |
| V4 | 79.6 | | | | 20 | 0.4 | |
| B4a | 64.36 | | 10.0 | | 25 | 0.4 | 0.25 |
| B4b | | 64.25 | 10.5 | | 25 | 0.25 | |
| B5 | 56.5 | | 15.1 | | 28 | 0.4 | |
| B6 | 56.17 | | 15.1 | | 28 | 0.4 | 0.33 |
| B7 | 56.17 | | | 15.1 | 28 | 0.4 | 0.33 |
| B8 | 51.0 | | 13.6 | | 35 | 0.4 | |
| B9 | | 55.65 | 9.1 | | 35 | 0.25 | |
| B10 | 39.1 | | 10.5 | | 50 | 0.4 | |

For the powders, the melting temperature ($T_M$) was determined as described above.

The crystallization temperature ($T_C$) was determined by means of differential scanning calorimetry (DSC). For this purpose, first a heating run (H) at a heating rate of 20 K/min and then a cooling run (C) at a cooling rate of 20 K/min were measured. The crystallization temperature ($T_C$) is the temperature at the extreme of the crystallization peak.

The magnitude of the complex shear viscosity was determined by means of a plate-plate rotary rheometer at an angular frequency of 0.5 rad/s and a temperature of 240° C. A "DHR-1" rotary viscometer from TA Instruments was used, with a diameter of 25 mm and a plate separation of 1 mm. Unequilibrated samples were dried at 80° C. under reduced pressure for 7 days and these were then analyzed with a time-dependent frequency sweep (sequence test) with an angular frequency range of 500 to 0.5 rad/s. The following further analysis parameters were used: deformation: 1.0%, analysis time: 20 min, preheating time after sample preparation: 1.5 min.

The sintering window (W) was determined, as described above, as the difference between the onset temperature of melting ($T_M^{onset}$) and the onset temperature of crystallization ($T_C^{onset}$).

To determine the thermooxidative stability of the sinter powders, the complex shear viscosity of freshly produced sinter powders and of sinter powders after oven aging at 0.5% oxygen and 195° C. for 16 hours was determined. The ratio of viscosity after storage (after aging) to the viscosity before storage (before aging) was determined.

The viscosity is measured by means of rotary rheology at a measurement frequency of 0.5 rad/s at a temperature of 240° C.

The results can be seen in table 4.

TABLE 4

| Example | Magnitude of complex viscosity at 0.5 rad/s, 240° C. [Pas] | Ratio of viscosity after aging to before aging | $T_M$ [° C.] | $T_C$ [° C.] | Sintering window W[K] | Sintering window W after aging [K] |
|---|---|---|---|---|---|---|
| V1 | 632 | 3.4 | 218.2 | 172.5 | 28.3 | 27.1 |
| B2 | 1030 | 0.98 | 217.6 | 173.8 | 24.4 | 24.0 |
| B3 | 1350 | 1.24 | 217.9 | 174.9 | 26.1 | 25.9 |
| V4 | 1140 | 0.95 | 219.1 | 183.7 | 21.6 | 17.5 |
| B4a | 1380 | 1.26 | 217.8 | 178.8 | 22.1 | n.d. |
| B4b | 6250 | 3.8 | 193.0 | 143.2 | 29.6 | n.d. |
| B5 | 1646 | 1.2 | 217.6 | 173.8 | 26.4 | n.d. |
| B6 | 1630 | 1.2 | 217.2 | 173.0 | 26.3 | 25.7 |
| B7 | 2910 | 1.05 | 218.2 | 176.0 | 25.3 | 21.1 |
| B8 | 2646 | 1.5 | 217.3 | 173.3 | 24.6 | n.d. |
| B9 | 9300 | 5.5 | 192.5 | 143.9 | 29.0 | 40.1 |
| B10 | 6100 | 5.3 | 217.1 | 172.6 | 27.9 | n.d. | n.d.: not determined

It is apparent that the sinter powders of the invention have a sintering window sufficient for selective laser sintering, even after aging.

In addition, for the sinter powders obtained, bulk density is determined to DIN EN ISO 60 and tamped density to DIN EN ISO 787-11, as is the Hausner factor as the ratio of tamped density to bulk density.

Particle size distribution, reported as the D10, D50 and D90 value, was determined as described above with a Malvern Mastersizer.

Magnesium content was determined by means of atomic spectroscopy.

The avalanche angle was determined by means of a Revolution Powder Analyzer (RPA) with a rotation speed of 0.6 rpm and 15 images per second. The average was found from 128 avalanche events.

The results can be seen in table 5.

Laser Sintering Experiments

The sinter powders (SP) were introduced with a layer thickness of 0.1 mm into the cavity at the temperature specified in table 6. The sinter powders were subsequently exposed to a laser with the laser power output specified in table 6 and the point spacing specified, with a speed of the laser over the sample during exposure of 15 m/sec. The point spacing is also known as laser spacing or lane spacing. Selective laser sintering typically involves scanning in stripes. The point spacing gives the distance between the centers of the stripes, i.e. between the two centers of the laser beam for two stripes. The laser sintering experiments were done on Farsoon HT251.

TABLE 5

| Examples | Bulk density [kg/m$^3$] | Tamped density [kg/m$^3$] | Hausner factor | D10 [µm] | D50 [µm] | D90 [µm] | Avalanche angle [°] | Mg content [g/100 g] |
|---|---|---|---|---|---|---|---|---|
| V1 | 460 | 570 | 1.24 | 39 | 65 | 107 | 52 | 0 |
| B2 | 499 | 600 | 1.20 | 42 | 66.5 | 104 | n.d. | n.d. |
| B3 | 532 | 642 | 1.21 | 37 | 63.5 | 104 | n.d. | 8.5 |
| V4 | n.d. | n.d. | n.d. | 38 | 65.5 | 108 | n.d. | n.d. |
| B4a | n.d. | n.d. | n.d. | 39.2 | 65.3 | 106 | n.d. | n.d. |
| B4b | 520 | 634 | 1.22 | 39 | 65.8 | 108 | n.d. | n.d. |
| B5 | n.d. | n.d. | n.d. | 35 | 63.5 | 108 | 45.9 | n.d. |
| B6 | n.d. | n.d. | n.d. | 48.5 | 75.7 | 117 | 51.1 | n.d. |
| B7 | n.d. | n.d. | n.d. | 43 | 67.4 | 104 | n.d. | n.d. |
| B8 | n.d. | n.d. | n.d. | 38 | 63 | 103 | n.d. | n.d. |
| B9 | 553 | 684 | 1.24 | 37.6 | 64.5 | 107 | n.d. | n.d. |
| B10 | n.d. | n.d. | n.d. | 40 | 66 | 107 | n.d. | n.d. | n.d.: not determined

TABLE 6

| Example | Construction space temperature [° C.] | Laser power output [W] | Laser speed [m/s] | Point spacing [mm] |
|---|---|---|---|---|
| V1 | 198 | 25 | 5 | 0.2 |
| B2 | 206 | 55 | 15 | 0.2 |
| B3 | 205 | 32 | 5 | 0.2 |
| V4 | 203 | 68 | 12.5 | 0.2 |
| B4a | 207 | 50 | 15 | 0.2 |
| B4b | 184 | 50 | 15 | 0.2 |
| B5 | 208 | 55 | 15 | 0.2 |
| B6 | 202 | 55 | 15 | 0.2 |
| B7 | 204 | 55 | 15 | 0.2 |
| B8 | 200 | 32 | 5 | 0.2 |
| B9 | 190 | 55 | 15 | 0.2 |
| B10 | 206 | 30 | 5 | 0.2 |

The flame retardancy properties of the laser-sintered test specimens were determined to UL 94 Vx: 2016 (vertical test). The determination was effected firstly after storage at 23° C. and 50% relative humidity for 2 days and secondly after storage at 70° C. in a drying cabinet for 7 days.

The results and the thickness of the test specimens are shown in table 7.

TABLE 7

| Example | Thickness of UL test specimen [mm] | 2 days/23° C./ 50% r.h. | 7 days/70° C. |
|---|---|---|---|
| V1 | 0.8 | V-- | V-- |
|  | 1.7 | V-- | V-- |
| B2 | 0.96 | V-- | V-- |
|  | 1.6 | V-- | V-- |
| B3 | 1.25-1.4 | V-2, 41 s | V-2, 40 s |
|  | 0.85 | V-2, 20 s | V-2, 17 s |
|  | 0.94 | V-2, 66 s | n.d. |
|  | 1.5 | V-2, 44 s | V-2, 48 s |
|  | 2.2 | V-2, 51 s | V-2, 69 s |
| V4 | 0.84 | V-2, 15 s | V-2, 69 s |
|  | 1.7 | V-2, 49 s | V-2, 73 s |
| B4a | 0.52 | V-2, 14 s | V-2, 9 s |
|  | 0.84 | V-2, 9 s | V-2, 21 s |
|  | 1.7 | V-2, 60 s | V-2, 68 s |
| B4b | 0.82 | V-2, 16 s | V-2, 6 s |
|  | 1.56 | V-2 38 s | V-2, 31 s |
| B5 | 1.0 | n.d. | V-2, 33 s |
|  | 1.8 | n.d. | V-2, 79 s |
| B6 | 0.81 | V-2, 13 s | V-2, 11 s |
|  | 1.6 | V-2, 44 s | V-2, 46 s |
| B7 | 0.88 | V-2, 12 s | V-2, 19 s |
|  | 1.6 | V-2, 47 s | V-2, 57 s |
| B8 | 0.84 | V-2, 17 s | n.d. |
|  | 1.8 | V-2, 54 s | n.d. |
| B9 | 0.95 | V-2, 19 s | V-2, 13 s |
|  | 1.7 | V-2, 48 s | V-2, 42 s |
| B10 | 1.0 | V-2, 21 s | n.d. |
|  | 1.9 | V-2, 19 s | n.d. | n.d.: not determined

Subsequently, the properties of the tensile bars (sinter bars) obtained were additionally determined. The tensile bars (sinter bars) obtained were tested in the dry state after drying at 80° C. for 336 hours under reduced pressure. The results are shown in table 8. Charpy specimens were also produced, which were likewise tested in dry form (to ISO 179-2/1 eA(F): 1997+ Amd. 1: 2011 and to ISO 179-2/1 eU: 1997+ Amd. 1: 2011).

Tensile strength, tensile modulus of elasticity and elongation at break were determined to ISO 527-2: 2012.

Heat deflection temperature (HDT) was determined according to ISO 75-2: 2013, using both Method A with an edge fiber stress of 1.8 N/mm$^2$ and Method B with an edge fiber stress of 0.45 N/mm$^2$.

The results can be seen in table 8.

TABLE 8

| Example | Charpy impact resistance unnotched [kJ/m$^2$] | Charpy impact resistance notched [kJ/m$^2$] | Tensile strength [MPa] | Tensile modulus of elasticity [MPa] | Elongation at break [%] | HDT A [° C.] | HDT B [° C.] |
|---|---|---|---|---|---|---|---|
| V1 | 4.94 | 1.5 | 56.7 | 3660 | 1.7 | 94.4 | 150.4 |
| B2 | n.d. | n.d. | n.d. | n.d. | n.d. | n.d. | n.d. |
| B3 | 7.3 | 2.9 | 61 | 4390 | 1.6 | 114 | 210 |
| V4 | 8.2 | 2.3 | 62 | 4370 | 1.8 | n.d. | n.d. |
| B4a | 7.0 | 1.5 | 63 | 5170 | 1.4 | n.d. | n.d. |
| B4b | n.d. | n.d. | 54 | 3610 | 1.9 | n.d. | n.d. |
| B5 | 8.1 | 1.4 | 64 | 5230 | 1.4 | 116 | 203 |
| B6 | n.d. | n.d. | 49 | 5560 | 1.6 | 123 | 203 |
| B7 | n.d. | n.d. | 57 | 4780 | 1.4 | n.d. | n.d. |
| B8 | n.d. | n.d. | n.d. | n.d. | n.d. | n.d. | n.d. |
| B9 | n.d. | n.d. | 41 | 3680 | 1.5 | n.d. | n.d. |
| B10 | 5.0 | 2.0 | 53 | 7090 | 0.8 | 126 | 204 | n.d.: not determined

The sinter powders of the invention show good SLS processability and low warpage.

The invention claimed is:

1. A process for producing a shaped body, comprising the steps of:
   i) providing a layer of a sinter powder (SP) comprising the following components:
      (A) at least one semicrystalline polyamide,
      (B) at least one amorphous polyamide,
      (C) at least one mineral flame retardant,
   ii) exposing the layer of the sinter powder (SP) provided in step i), wherein the sinter powder (SP) comprises in the range from 30% to 70% by weight of component (A), in the range from 5% to 25% by weight of component (B) and in the range from 20% to 60% by weight of component (C), based in each case on the total weight of the sinter powder (SP);
      wherein component (C) in the sinter powder (SP) has been coated with component (A) and/or with component (B).

2. The process according to claim 1, wherein component (C) is based on magnesium and/or aluminum.

3. The process according to claim 1, wherein component (C) is selected from the group consisting of magnesium hydroxide, aluminum oxide hydroxide and aluminum hydroxide.

4. The process according to claim 1, wherein the exposing in step ii) is effected with a radiation source selected from the group consisting of lasers and infrared sources.

5. The process according to claim 1, wherein component (A) is selected from the group consisting of PA 4, PA 6, PA 7, PA 8, PA 9, PA 11, PA 12, PA 46, PA 66, PA 69, PA 6.10, PA 6.12, PA 6.13, PA 6/6.36, PA6T/6, PA 12.12, PA 13.13, PA 6T, PA MXD6, PA 6/66, PA 6/12 and copolyamides of these.

6. The process according to claim 1, wherein component (B) is selected from the group consisting of PA 6I/6T, PA 6I and PA 6/3T.

7. The process according to claim 1, wherein the sinter powder (SP) additionally comprises in the range from 0.1% to 10% by weight of at least one additive selected from the group consisting of antinucleating agents, stabilizers, end group functionalizers, dyes and color pigments, based on the total weight of the sinter powder (SP).

8. The process according to claim 1, wherein the sinter powder (SP) has
   a D10 in the range from 10 to 60 µm,
   a D50 in the range from 25 to 90 µm and
   a D90 in the range from 50 to 150 µm,
   wherein the D10, D50 and D90 values are determined by means of laser diffraction using a Mastersizer 3000 by Malvern.

* * * * *